(12) United States Patent  (10) Patent No.: US 8,107,814 B2
Kien et al.  (45) Date of Patent: Jan. 31, 2012

(54) TRANSPORTING UPSTREAM DATA IN A PASSIVE OPTICAL NETWORK

(75) Inventors: Thai-Bao H. Kien, Suwanee, GA (US); Amin Farvez, Lawrenceville, GA (US); Richard J. Futch, Lawrenceville, GA (US); Richard T. Causey, Sawanee, GA (US); Michael Jones, Grayson, GA (US)

(73) Assignee: Cisco Technology, Inc., San Jose, CA (US)

( * ) Notice: Subject to any disclaimer, the term of this patent is extended or adjusted under 35 U.S.C. 154(b) by 750 days.

(21) Appl. No.: 12/179,745

(22) Filed: Jul. 25, 2008

(65) Prior Publication Data

US 2010/0021172 A1 Jan. 28, 2010

(51) Int. Cl.
  *H04J 14/00* (2006.01)
(52) U.S. Cl. ................................ 398/70; 398/71; 398/98
(58) Field of Classification Search .................... 398/33, 398/58, 63, 67, 68, 70–72, 74, 75, 66, 69, 398/98, 99
  See application file for complete search history.

(56) References Cited

U.S. PATENT DOCUMENTS

| 7,079,768 | B2 * | 7/2006 | Ruan et al. ....................... 398/58 |
| 2003/0007212 | A1 * | 1/2003 | Sala et al. ....................... 359/136 |
| 2010/0040099 | A1 * | 2/2010 | Blauvelt et al. .................. 372/31 |

\* cited by examiner

*Primary Examiner* — M. R. Sedighian
(74) *Attorney, Agent, or Firm* — Tarolli, Sundheim, Covell & Tummino LLP

(57) ABSTRACT

Upstream data handling in a digital Data Over Cable Service Interface Specification (DOCSIS) passive optical network (DPON). Embodiments include receiving at a headend, in an upstream path over an optical network, a plurality of digitized and serialized DPON upstream packets respectively distributed in a time division multiplexed fashion, wherein each DPON upstream packet includes a header, a trailer and a payload, monitoring the optical network for energy in the upstream path, including energy associated with a header and a trailer of respective DPON upstream packets, controlling a bit stuffer that adds bits to the upstream path to (1) stop adding bits to the upstream path when energy is detected in the upstream path and (2) resume adding bits to the upstream path after an end of a trailer of a given DPON upstream packet has been detected, and removing the header and the trailer of the respective DPON upstream packets. The resulting original payload is then digital to analog converted, and the resulting data is passed to, e.g., a cable modem termination system (CMTS).

23 Claims, 8 Drawing Sheets

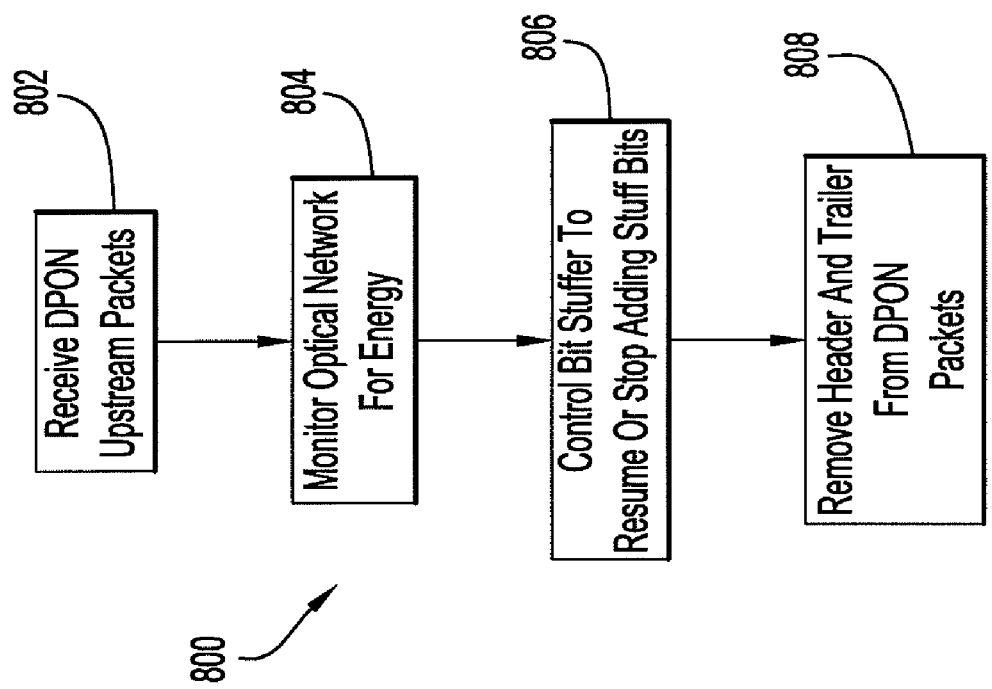

TRANSPORTING UPSTREAM DATA IN A PASSIVE OPTICAL NETWORK

FIELD OF THE INVENTION

Embodiments of the present invention relate to methods of transporting upstream DOCSIS data in a digital Data Over Cable Service Interface Specification (DOCSIS) passive optical network (DPON).

BACKGROUND OF THE INVENTION

As shown in FIG. 1, in a DOCSIS Passive Optical Network (DPON) system 100, DOCSIS downstream data from a headend 102 (of, e.g., a cable television system) is sent to the end user premises 101 via an analog laser 110 (operating at, e.g. 1550 nm), which carries Quadrature Amplitude Modulation (QAM) modulated signals that could be either video or data. Upstream data from each user premises' optical network terminal (ONT) 108 are sent back at precise allocated time slots, assigned by a cable modem termination system (CMTS) 130 at the headend 102, as in a Time Division Multiplex (TDM) system. The upstream transmitter laser 125 in each ONT 108 is turned on during its assigned transmission time, and off otherwise. All upstream transmitter lasers 125 could have the same wavelength (e.g. 1310 nm) or different wavelengths (in which case a dense wavelength division muliplexer (DWDM) would be employed in place of the simple 1-N optical splitter 120).

As further shown, upstream data passes through an optical fiber 150 that is connected to an optical multiplexer 132, which allows upstream and downstream data to coexist on the single optical fiber 150. Upstream data is passed to an optical receiver 134 and converted to electrical signals and passed to the CMTS 130 as a radio frequency (RF) signal (typically in the 5 MHz-42 (or 85) MHz band). The upstream data is originally generated at the ONT 108 in a cable modem/data processor 128 and an optical diplexer 122 operates such that the ONT 108 can communicate upstream and downstream using the same optical fiber 150.

On the downstream side, the CMTS 130 produces a downstream RF signal (typically in the 50 MHz-1002 MHz band) and passes that signal to laser driver 110 (which, as noted, may be a 1550 nm laser). The resulting optical signal makes its way to ONT 108 via optical multiplexer 132, optical fiber 150 and 1-N optical combiner 120, and is split from any upstream data at the ONT's optical diplexer 122, whereupon the downstream data is passed to receiver 127, and then on to cable modem/data processor 128.

Upstream data could be sent via analog lasers or digital lasers. In the case of analog lasers, reverse QAM modulated signal output from cable modem 128 may simply be used to drive analog lasers directly. The converted optical signal is sent back to the headend 102, where the optical signal is converted back to electrical RF signal, then fed to the CMTS 130, as explained. Though simple, the usage of analog lasers requires lasers with high gain, deep reach, low noise, and hence, are quite expensive, and therefore not that attractive in a DPON network.

Digital laser use in the upstream path offers certain advantages over analog lasers. The theoretical signal-to-noise ratio of a digitized signal is:

$$6.02N + 1.76 dB + 10 \log_{10}\{(fs/(2 \ast Bw)\}, \quad \text{(Equation 1)}$$

where N is the number of bits used to digitize the analog signal, and fs is the Nyquist bandwidth. As implied in the above equation, the signal-to-noise ratio could be increased by raising the number of digitized bits N, effectively increasing the signal strength. The last term of the equation also shows that a 3 dB processing gain could be obtained each time fs is doubled. The abundant availability of digital lasers and analog-to-digital (A/D) converters offer a more robust and cost effective solution for upstream data transport in DPON as compared to using analog lasers. FIG. 2 shows a typical DPON system that uses digital lasers in the upstream portion. This system is similar to the one shown in FIG. 1, except that Serializer/Deserializer (SERDES) devices 202, 204 are used at each ONT 108 and at the headend to transmit and receive digitized serial signals.

As mentioned, and as shown in FIG. 3, respective upstream data bursts 302, 304, 306, 308 from ONTs 108 are sent back in a time-division-multiplex scheme. In the case of a DOCSIS compliant system, each data burst 302, 304, 206, 308 follows DOCSIS standards. And, in the case of a digital DPON system, each burst consists of serial bits in GHz data rates.

Improvements to this architecture and methodology are desirable.

BRIEF DESCRIPTION OF THE DRAWINGS

FIG. 8 depicts a process in accordance with an embodiment of the present invention.

DETAILED DESCRIPTION

Overview

Embodiments of the present invention provide a methodology, and related system components, that enables upstream data transmission from individual user premises and reception of that data at a headend. More specifically, a method, related logic and system is provided to receive at a headend, in an upstream path over an optical network, a plurality of digitized and serialized Data Over Cable Service Interface Specification (DOCSIS) passive optical network (DPON) upstream packets respectively distributed in a time division multiplexed fashion, wherein each DPON upstream packet includes a header, a trailer and a payload. Embodiments of the present invention further provide detecting and removing the header and the trailer of respective DPON upstream packets, monitoring the optical network for energy in the upstream path, and controlling a bit stuffer that adds bits to the upstream path to (1) stop adding bits to the upstream path when energy is detected in the upstream path and (2) resume adding bits to the upstream path after an end of a trailer of a given DPON upstream packet has been detected. This bit stuffing control allows a phase locked loop (PLL) of a serializer/deserializer (SERDES) that is receiving "burst"-like energy to maintain lock so that subsequent data received over the optical network is not lost.

Description of Example Embodiments

One of the challenges in a digital DPON system is how to digitize upstream data at each user premises, transmit it, receive it at the headend 102, convert it back to an RF signal, then feed it to the CMTS 130, all without corrupting the stringent DOCSIS timing standards on upstream data bursts. In other words, the DPON system should be transparent to DOCSIS—as if system components were connected via coaxial cable (i.e., without an intervening digital optical network). Embodiments of the present invention provide an architecture and methodology that provides improved timing, among other benefits.

Figure 4:
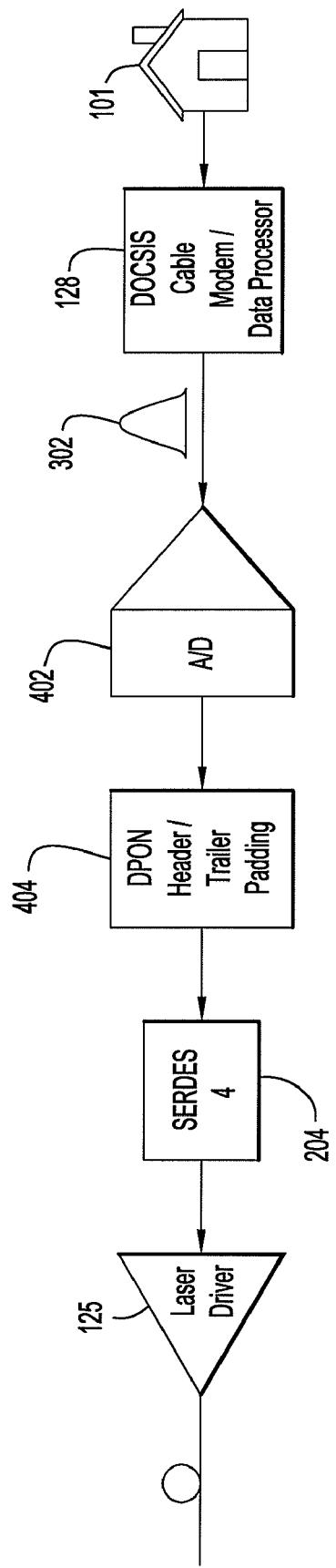
FIG. 4 is a block diagram of a portion of an optical network terminal (ONT) in accordance with an embodiment of the present invention.
Figure 5:
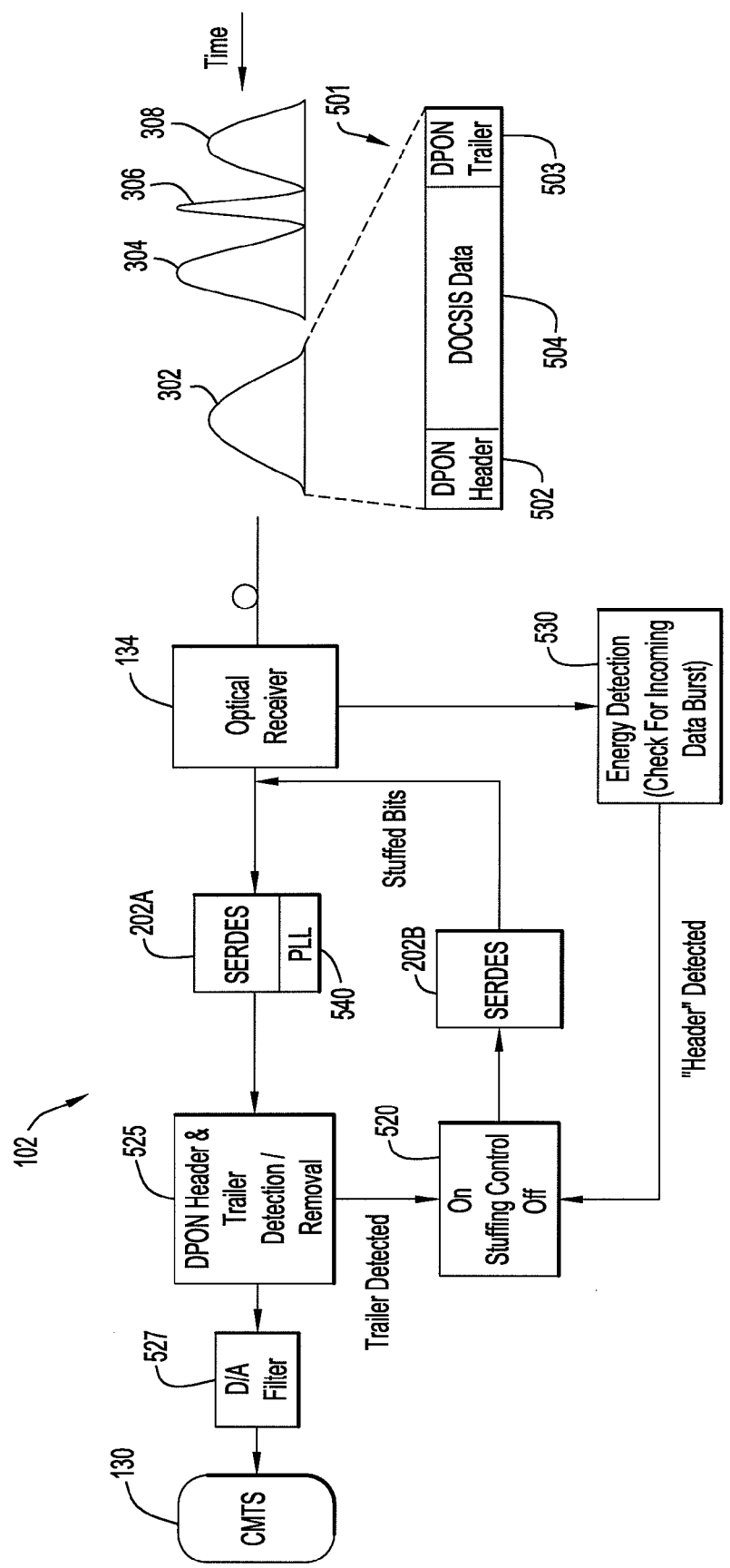
FIG. 5 is a block diagram of an optical receiver in accordance with an embodiment of the present invention.

FIGS. 4 and 5 illustrate a system and methodology to transport digitized upstream DOCSIS data in a DPON system, using a "non-burst" optical receiver, i.e., a receiver that is not configured to discern only relevant burst energy.

Referring first to FIG. 4, at the customer premises 101, the entire reserve bandwidth (5-42 MHz) (i.e., the upstream band) from each DOCSIS cable modem/data processor 128 is digitized at, e.g., 100 MHz. For this function, a 10-12 bit A/D converter 402 could be used. Note that with some different RF circuitry, selected individual reverse channels can also be digitized (max. bandwidth=6.4 MHz). Such a scheme allows for slower A/D converters, resulting in a lower data rate. Equation 1 above sheds light on the effects of changing selected variables.

At digitization at 100 MHz, the following applies:

(12 bit $A/D$)×100 MHz=1200 Mbps.

Special dedicated DPON headers and trailers 502, 503 (see FIG. 5) are added to each reverse data burst of DOCSIS data (or payload) 504 using padding module 404, which may be implemented in, e.g., a field programmable gate array (FPGA). Note that the start and end of each upstream DOCSIS burst could be easily detected by using either the data information (e.g., header information) or by detecting the burst energy. This start/stop information is also readily available from a connected cable modem chip (if access to this chip is available).

The thus digitized data stream (padded with DPON headers and trailers) is then sent to SERDES 204 (part of ONT 108), which in turn drives digital laser 125 that feeds the DPON upstream optical path. Note that SERDES 204 should be clocked at a higher frequency than the original data rate (i.e., 1200 Mbps for a 12-bit A/D or 1000 Mbps for a 10-bit A/D scheme) so that extra bits associated with DPON headers and trailers can be properly inserted. Readily available 1.25 Gbps, or 2.5 Gbps lasers provide the needed higher data rate functionality. Since the padded DPON headers and trailers have a predefined/constant number of bits (that will eventually be removed at the headend side), the addition and removal of these bits will not affect the DOCSIS TDM timing.

Figure 1:
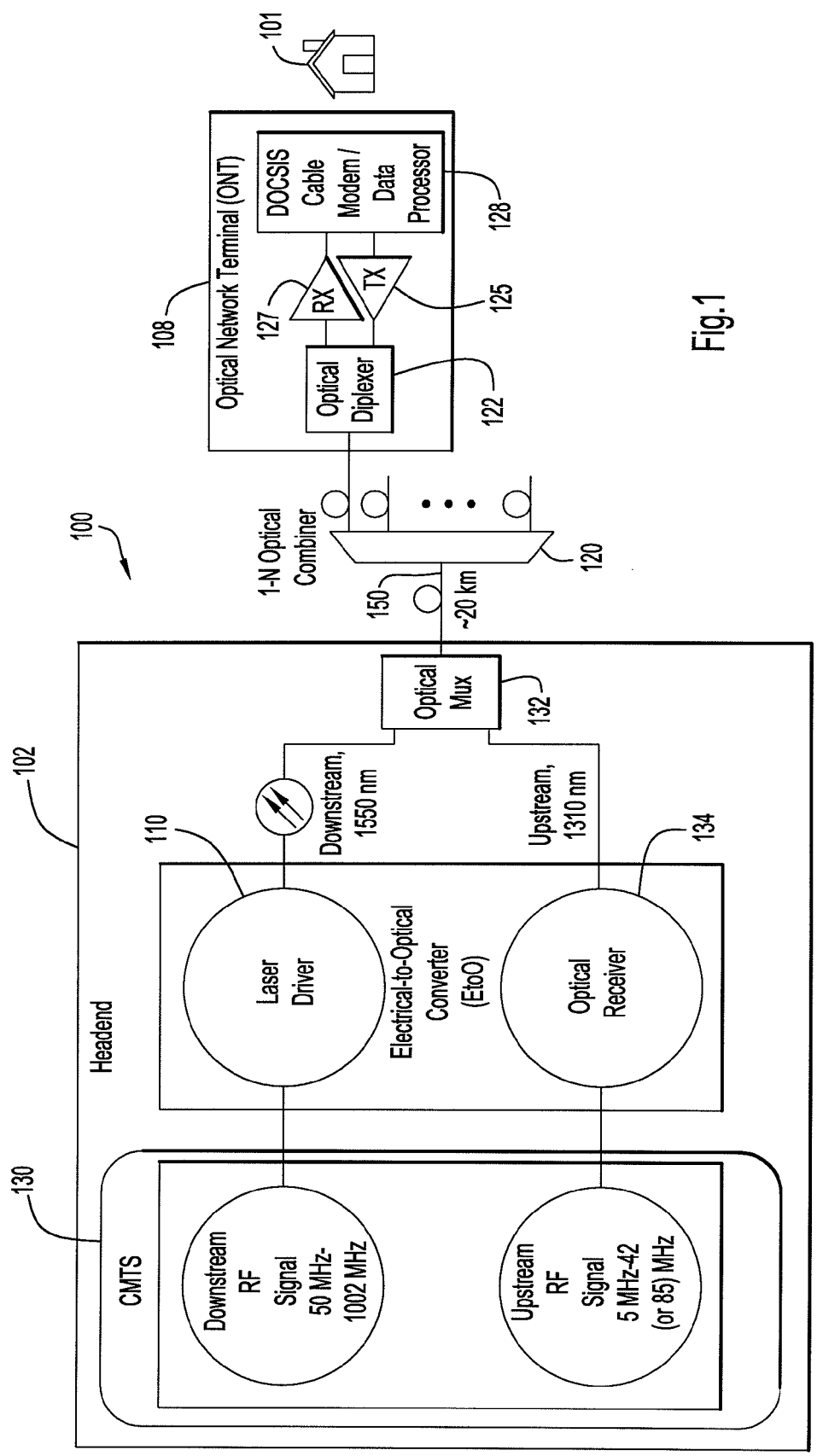
FIG. 1 shows a DOCSIS passive optical network (DPON) in which embodiments of the present invention may be implemented.
Figure 2:
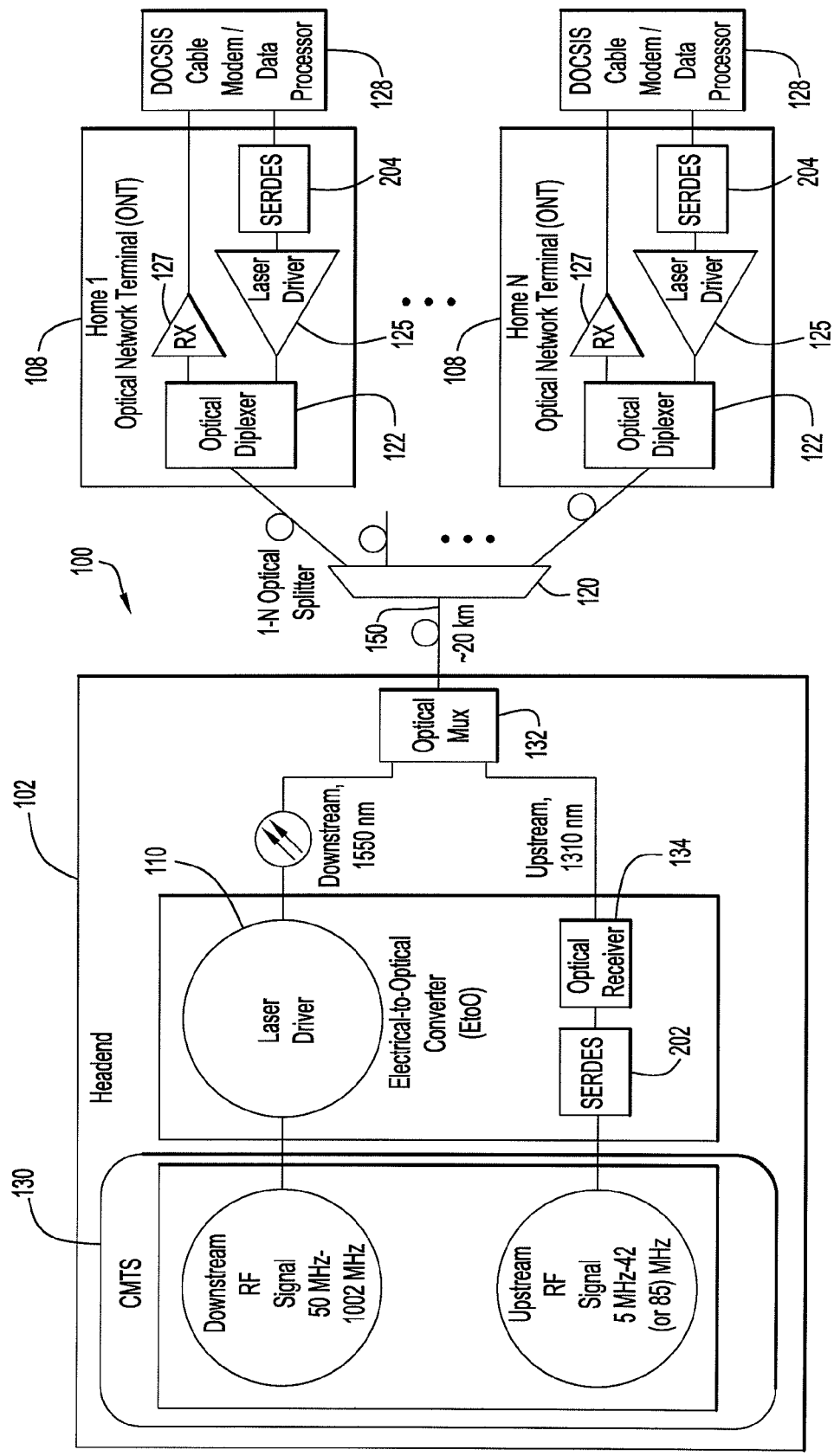
FIG. 2 is shows a digital DPON in which embodiments of the present invention may be implemented.
Figure 3:
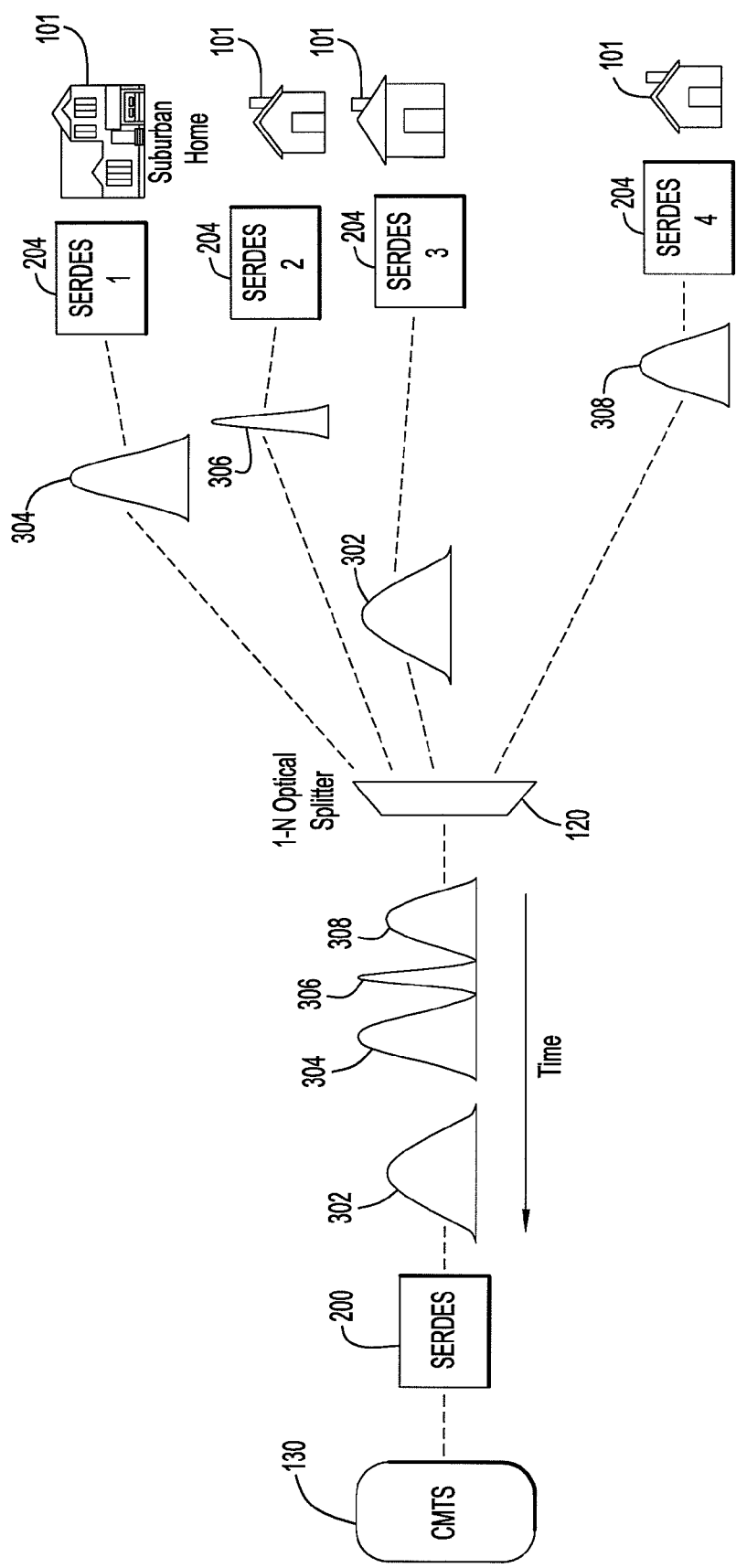
FIG. 3 illustrates time division multiplexing of upstream data in a DPON in accordance with the present invention.

Using the configuration shown in FIG. 4, optical signal streams carry upstream data from multiple user premises 101 and are multiplexed using passive optical combiner, using the topology shown in FIGS. 1 and 2. The high signal-to-noise ratio and processing gain (as indicated in Equation 1) obtained from digitization of the upstream signals allows the transport of these optical signals using relatively low cost lasers.

Reference is now made to FIG. 5, which depicts a headend architecture to recover the data from incoming bursts in accordance with an embodiment of the present invention. Specifically, at the headend 102, upstream optical serial data is first converted back from an optical signal to an electrical signal (e.g., using a photo detector/transimpedance circuitries) in optical receiver 134.

The serial electrical signal is then fed into SERDES 202A to recover the data bit streams originating from individual user premises 101. Note that this stream is an aggregation of bursts, at "random" spacing, with "random" widths. Although these bursts look "random", their timing and widths are actually governed by the CMTS 130, following DOCSIS standards, namely, Burst width: 6.25 us*n; n=1-255;
Minimum spacing between two adjacent bursts guard time for 64-QAM=5 symbol time=~163 ns; and
Maximum spacing between two adjacent bursts undetermined, could be seconds, depending on upstream traffic.

The semi-random nature of these bursts presents a "locking" dilemma for the receiving SERDES 202A located at the headend 102. For most SERDES devices 202, if the input data stream is absent for 300-1000 bits (×2.5 GHz=120 ns-400 ns), the SERDES's clock recovery phase locked loop (PLL) 540 becomes "unlocked". In most cases, the PLL 540 would then take micro seconds (~3000 bits=1.2 us or more) to re-acquire a "lock" condition from an incoming data burst. However, by that time, some data would be lost. Embodiments of the present invention provide the ability to prevent such data loss in the upstream path while preserving DOCSIS timing control.

Referring still to FIG. 5, and in accordance with an embodiment of the present invention, while SERDES 202A is receiving data from an incoming burst (or DPON upstream packet) 501, the DPON trailer 503 will be searched for. Once the end of a DPON trailer 503 is found, SERDES 202B starts or resumes inserting stuff bits into the input of SERDES 202A. This bit stuffing prevents SERDES 202A from entering an "unlock" mode. SERDES 202B is controlled by stuffing control module 520, which is itself controlled by DPON header & trailer detection/removal module 525, which is configured to detect the DPON packet trailer 503.

A separate energy detection circuit 530 preferably monitors for an incoming packet 501. Many schemes could be used for this function (e.g., Burst Mode Gateway detection schemes as described in U.S. Pat. Nos. 6,751,271 and 6,721,352, which are incorporated herein by reference). With the padded DPON headers, no data will be lost in this detection. The size of header 502 may also be chosen to discriminate/filter against rare burst noises. For example, choosing a header with a certain or predetermined length facilitates filtering of noise spikes with shorter duration. Once an incoming burst of data 501 is detected, the stuffing bits from SERDES 202B are turned off, allowing SERDES 202A to receive "real" data again.

As further shown in FIG. 5, DPON headers and trailers 502, 503 that were inserted at the customer premises 101 are then removed by DPON header & trailer detection/removal module 525. Digital data is then fed to a digital-to-analog converter (DAC) 527 (which may also include a filter function) to recover analog signal. That signal is then sent to the CMTS 130.

Figure 6:
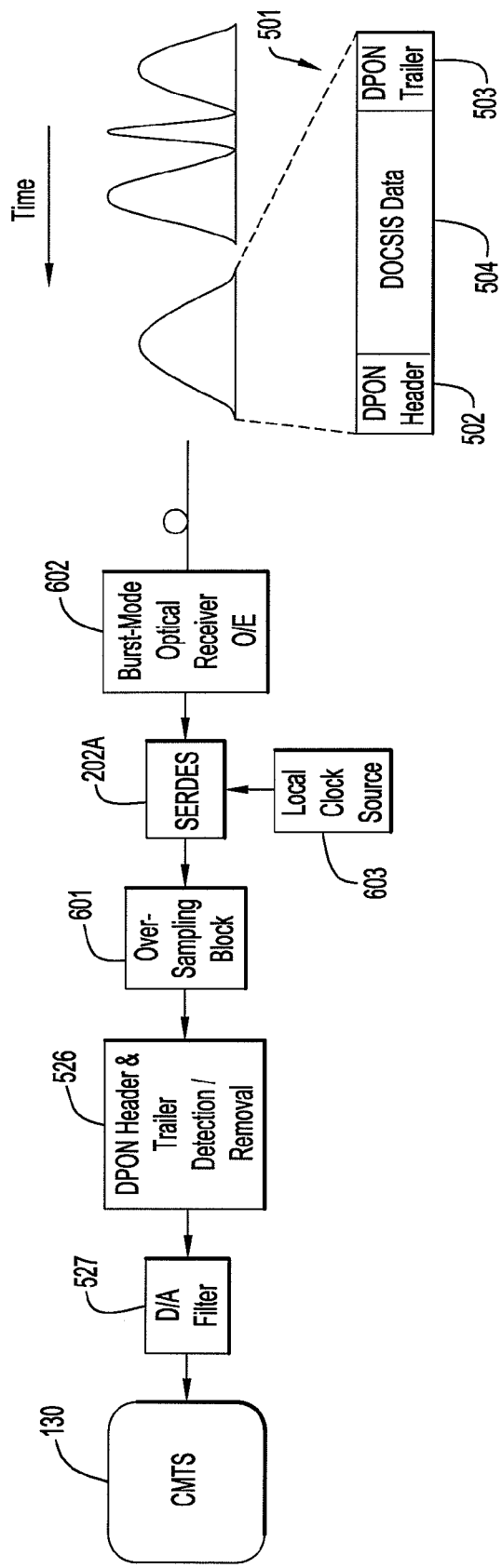
FIG. 6 is a block diagram of another embodiment of an optical receiver in accordance with the present invention.

Another embodiment for recovering data from incoming bursts in accordance with the present invention is depicted in FIG. 6. In this embodiment, an over-sampling module 601 is used together with a burst-mode optical receiver 602. A typical burst-mode optical receiver (e.g., a Fujitsu FIM30535 GPON OLT SFP—Gigabit Passive Optical Network Optical Line Terminator Small Form-factor Pluggable), simply converts the incoming optical bursts into bursts of discrete electrical signals. The gaps between bursts are presented as streams of mostly "1" or "0". This stream of discrete electrical signal is then presented to SERDES 202A. The clock of SERDES 202A is based on a local clock source 603, not recovered from the incoming data stream. In one implementation, SERDES 202A treats the incoming data as at least three times faster than its actual data rate, i.e., SERDES 202A oversamples the incoming data stream, resulting in multiple outputs of the recovered data streams. The true data stream can then be extracted based on the alignment from the preamble of each data burst.

Embodiments described above explain how data can be transmitted and recovered in a digital DPON. However, depending on certain stringent requirements, the system clocks at the OLT 711 (receiver) and ONTs 108 (transmitters) should be synchronized, especially for the clocks that feed the A/Ds 402 (at the ONTs 108) and the D/A 527 (at the OLT 711). More specifically the frequencies of these clocks depend on the specific hardware implementation. For example, if a SERDES has a 20-bit interface at 187.5 MHz/word, then one of the system clocks is 187.5 MHz. Thus, (20 bits/word)×(187.5 words/second)=3.75 bits/seconds=3×1.25 Gbps=3× oversampling rate for a 1.25 Gbps digital link from a 1.25 GHz laser. The system clock frequencies would be different for the case of 5× (or others) oversampling, using a x-bit data transfer rate.

Figure 7:
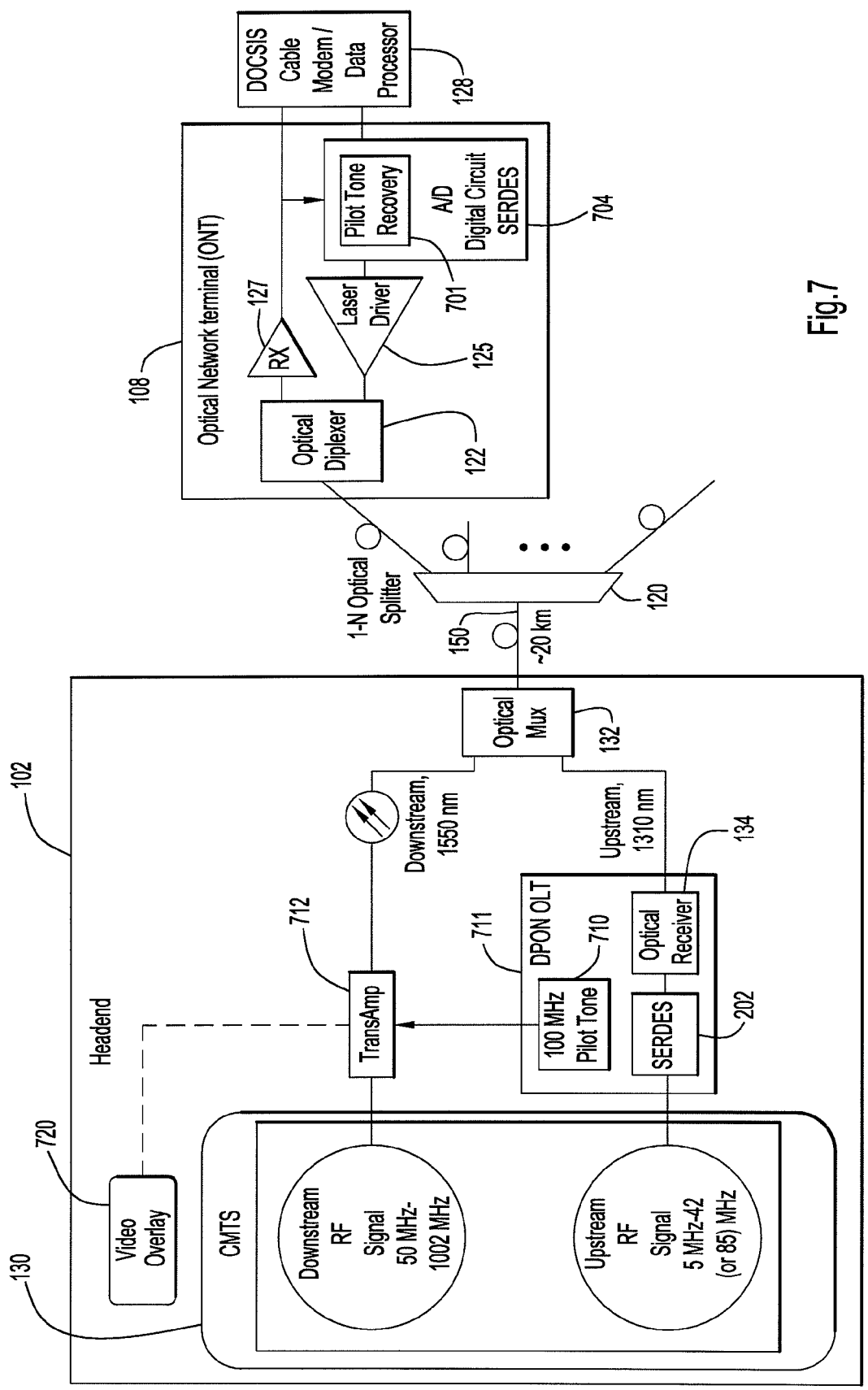
FIG. 7 is a block diagram of digital DPON with clock synchronization in accordance with an embodiment of the present invention.

In accordance with an embodiment of the present invention, and as shown in FIG. 7, a Pilot Tone is transmitted out of the headend 102 to be received by downstream ONTs 108. Specifically, at the headend 102, a Pilot Tone generator 710 generates a Pilot Tone, such as 10 MHz, that is injected into a TransAmplifier 712 (or a similar electrical to optical (E/O) device) via an RF connection. The TransAmplifier 712 transmits downstream signal from the CMTS 130, including a Video overlay signal 720 from a content manager (not shown) to all connected ONTs 108. The Pilot Tone itself could be modulated, e.g., using a carrier of 100 MHz, modulated at 10 MHz. The Pilot Tone is also locked to the clocks employed at the OLT 711, including SERDES 202, thereby synchronizing its clock with the clocks of the connected ONTs 108.

At the customer premises, all clocks are locked to the recovered Pilot Tone frequency, broadcasted from the downstream signal using a pilot tone recovery module 701 incorporated within SERDES 704 itself, or separately implemented.

Those skilled in the art will appreciate that embodiments of the present invention provide, among other things, Digitization of DOCSIS return signals;
Addition of DPON headers and trailers at user premises;
Detection of DPON headers and trailers at a headend;
Addition of data words at user premises and detecting/removing of the same at the headend for system monitoring and controlling purposes. These data words could be inserted and removed in a similar manner as of the DPON headers and trailers.
Insertion of stuffing bits to a SERDES to keep the SERDES' PLL in a "locked" mode; and
Controlling the width of the DPON headers to add additional filtering capabilities to the system.

FIG. 8 depicts a process 800 in accordance with an embodiment of the present invention. As shown, at step 802, digitized and serialized DOCSIS DPON upstream packets are received, e.g., at a headend, in an upstream path over an optical network. The DPON packets may be distributed in a time division multiplexed fashion, wherein each DPON upstream packet comprises a header, a trailer and a payload.

At step 804, the optical network is monitored for energy (e.g., individual bursts or packets) in the upstream path. At step 806, a bit stuffer that adds bits to the upstream path is controlled to (1) stop adding bits to the upstream path when energy is detected in the upstream path and (2) resume adding bits to the upstream path after an end of a trailer of a given DPON upstream packet has been detected.

At step 808, the header and the trailer of respective DPON upstream packets are removed. The "de-padded" packets may then be de-serialized and converted to analog signals for further upstream processing as already explained herein.

It will be apparent to those skilled in the art that various modifications and variations can be made in the systems and methods described herein consistent with the principles of the present invention without departing from the scope or spirit of the invention. Although several embodiments have been described above, other variations are possible consistent with the principles of the present invention.

Other embodiments of the invention will be apparent to those skilled in the art from consideration of the specification and practice of the disclosed embodiments. The specification and examples are exemplary only, and the true scope and spirit of the invention is defined by the following claims and their equivalents.

What is claimed is:

1. A method comprising:
receiving at a headend, in an upstream path over an optical network, a plurality of digitized and serialized Data Over Cable Service Interface Specification (DOCSIS) passive optical network (DPON) upstream packets respectively distributed in a time division multiplexed fashion, wherein each DPON upstream packet comprises a header, a trailer and a payload;
monitoring the optical network for energy in the upstream path, including energy associated with a header and a trailer of respective DPON upstream packets;
controlling a bit stuffer that adds bits to the upstream path to (1) stop adding bits to the upstream path when energy is detected in the upstream path and (2) resume adding bits to the upstream path after an end of a trailer of a given DPON upstream packet has been detected; and
removing the header and the trailer of the respective DPON upstream packets.

2. The method of claim 1, further comprising:
digitizing respective ones of the plurality of DPON upstream packets at optical network terminals (ONTs) on user premises.

3. The method of claim 2, further comprising:
adding the header and the trailer to the payload at the ONTs on user premises.

4. The method of claim 1, further comprising:
deserializing the serialized DPON upstream packets.

5. The method of claim 4, further comprising:
deserializing the serialized DPON upstream packets with a first serializer/deserializer (SERDES).

6. The method of claim 5, further comprising:
adding bits to the upstream path using a second SERDES.

7. The method of claim 1, further comprising:
digital to analog converting the payload of the DPON upstream packets.

8. The method of claim 7, further comprising:
sending a converted payload to a cable modem termination system (CMTS) of a headend.

9. The method of claim 1, further comprising:
sending a pilot tone, in a downstream band, from the headend to each of a plurality of connected optical network terminals (ONTs) from which the DPON upstream packets are received.

10. The method of claim 9, further comprising:
synchronizing clocks at respective ONTs with a clock at the headend using the pilot tone.

11. The method of claim 9, further comprising:
combining the pilot tone with a video signal.

12. The method of claim 1, further comprising:
controlling a width of the header.

13. The method of claim 1, wherein the step of receiving is performed with a non-burst mode optical receiver.

14. A non-transitory computer readable medium, having computer executable instructions, operable to:
receive at a headend, in an upstream path over an optical network, a plurality of digitized and serialized Data Over Cable Service Interface Specification (DOCSIS) passive optical network (DPON) upstream packets respectively distributed in a time division multiplexed fashion, wherein each DPON upstream packet comprises a header, a trailer and a payload;
monitor the optical network for energy in the upstream path, including energy associated with a header and a trailer of respective DPON upstream packets;
control a bit stuffer that adds bits to the upstream path to (1) stop adding bits to the upstream path when energy is detected in the upstream path and (2) resume adding bits to the upstream path after an end of a trailer of a given DPON upstream packet has been detected; and
remove the header and the trailer of the respective DPON upstream packets.

15. The non-transitory computer readable medium, having computer executable instructions. of claim 14, further operable to:
send a pilot tone, in a downstream band, from the headend to each of a plurality of connected optical network terminals (ONTs) from which the DPON upstream packets are received.

16. A system, comprising:
a first serializer/deserializer (SERDES) having an input connected to receive data transmitted over an optical network, the first SERDES including a phase locked loop (PLL);
a second SERDES having an output in communication with the input of the first SERDES; and
a bit stuffing controller, responsive to detection of energy on the optical network, that controls output of the second SERDES to (1) stop adding bits to the input of the first SERDES when energy is detected on the optical network and (2) resume adding bits to the input of the first SERDES when energy is no longer detected on the optical network.

17. The system of claim 16, further comprising a plurality of optical network terminals (ONTs) connected to the optical network.

18. The system of claim 17, further comprising a pilot tone generator that generates a pilot tone used to synchronize clocks associated with the first SERDES and the plurality of ONTs.

19. The system of claim 16, wherein the data transmitted over an optical network comprises digital Data Over Cable Service Interface Specification (DOCSIS) passive optical network (DPON) data.

20. The system of claim 19, wherein a header and a trailer are added to the DPON data.

21. The system of claim 20, further comprising a, DPON header and trailer detection and removal module.

22. The system of claim 16, further comprising a digital to analog converter for receiving deserialized data from the first SERDES.

23. The system of claim 22, further comprising a cable modem termination system (CMTS) in communication with the digital to analog converter.

* * * * *